US005504982A

United States Patent [19]

Sharp

[11] Patent Number: 5,504,982

[45] Date of Patent: Apr. 9, 1996

[54] EMBEDDED ARROWHEAD REMOVING TOOL

[76] Inventor: Jason W. Sharp, 6430 N. Sr. 75, North Salem, Ind. 46165

[21] Appl. No.: 266,611

[22] Filed: Jun. 27, 1994

[51] Int. Cl.[6] .......... B23P 19/04

[52] U.S. Cl. .......... 29/255; 29/254

[58] Field of Search .......... 29/254, 255, 275, 29/270, 264; 81/52.3, 52.35

[56] References Cited

U.S. PATENT DOCUMENTS

| | | | |
|---|---|---|---|
| 4,034,594 | 7/1977 | Morgan | 29/255 |
| 4,125,927 | 11/1978 | Geary | 29/255 |
| 4,476,598 | 10/1984 | Beauregard | 29/255 |
| 4,478,204 | 10/1984 | Kocsan | 29/254 |
| 4,483,058 | 11/1984 | Clutter et al. | 29/254 |

*Primary Examiner*—Robert C. Watson

[57] ABSTRACT

Disclosed is a new embedded arrowhead removing tool for pulling a lodged archery arrowhead, of a type having threads for shaft attachment, from an object without damaging the arrowhead. The embedded arrowhead removing tool comprises a rod having first and second ends, the second end having threads of a size cooperable with the threads of an arrowhead. An abutment is stationarily mounted on the first end. A weight is slidably mounted on the rod intermediate the abutment and the second end such that the weight may be forcibly struck against the abutment to apply longitudinal shocking force to the rod for extracting an arrowhead attached to the second end. A ring is stationarily mounted on the rod intermediate the weight and the second end for retaining the weight on the rod.

1 Claim, 4 Drawing Sheets

EMBEDDED ARROWHEAD REMOVING TOOL

BACKGROUND OF THE INVENTION

1. Field of the Invention

The present invention relates to archery equipment and more particularly pertains to an embedded arrowhead removing tool which may be adapted for pulling a lodged archery arrowhead, of a type having threads for shaft mounting, from an object without damaging the arrowhead.

2. Description of the Prior Art

The use of archery equipment is known in the prior art. More specifically, archery equipment heretofore devised and utilized for the purpose of removing embedded arrowheads is known to consist basically of familiar, expected and obvious structural configurations, notwithstanding the myriad of designs encompassed by the crowded prior art which have been developed for the fulfillment of countless objectives and requirements.

The present invention is directed to improving devices for removing embedded arrowheads in a manner which is safe, secure, economical and aesthetically pleasing.

U.S. Pat. No. 3,873,068 to Allen describes an archer's accessory tool for removing embedded arrowheads consisting of an elongated main body section having a gripping handle and a pair of spaced lugs projectable from one side of a forward end of the elongated main body for insertion into corresponding slots in the arrowhead. The device disclosed has several disadvantages; namely, the tool will not extract field point arrowheads, some embodiments of the invention may cause damage to the arrowhead during extraction, and the device will not extract fully embedded arrowheads.

The prior art also discloses a slide hammer tool and a forcible entry tool as shown in U.S. Pat. Nos. 5,109,739 and 5,088,174 respectively, both to Hull et al., a slide hammer apparatus of U.S. Pat. No. 5,085,281 to Selly, and a slide hammer nail puller in U.S. Pat. No. Des. 262,513 to Allen. While these devices fulfill their respective, particular objectives and requirements, the aforementioned patents do not disclose an embedded arrowhead removing tool for pulling a lodged archery arrowhead, of a type having threads for shaft mounting, from an object without damaging the arrowhead.

In this respect, the embedded arrowhead removing tool according to the present invention substantially departs from the conventional concepts and designs of the prior art, and in so doing provides an apparatus primarily developed for the purpose of pulling a lodged archery arrowhead from an object without damaging the arrowhead.

Therefore, it can be appreciated that there exists a continuing need for a new embedded arrowhead removing tool which can be used for pulling a lodged archery arrowhead, of a type having threads for shaft mounting, from an object without damaging the arrowhead. In this regard, the present invention substantially fulfills this need.

As illustrated by the background art, efforts are continuously being made in an attempt to develop devices for removing embedded arrowheads. No prior effort, however, provides the benefits attendant with the present invention. Additionally, the prior patents and commercial techniques do not suggest the present inventive combination of component elements arranged and configured as disclosed and claimed herein.

The present invention achieves its intended purposes, objects, and advantages through a new, useful and unobvious combination of method steps and component elements, with the use of a minimum number of functioning parts, at a reasonable cost to manufacture, and by employing only readily available materials.

SUMMARY OF THE INVENTION

In view of the foregoing disadvantages inherent in the known types of archery equipment now present in the prior art, the present invention provides a new archery equipment construction wherein the same can be utilized for pulling a lodged archery arrowhead, of a type having threads for shaft mounting, from an object without damaging the arrowhead. As such, the general purpose of the present invention, which will be described subsequently in greater detail, is to provide a new embedded arrowhead removing apparatus and method which has all the advantages of the prior art removing tools and none of the disadvantages.

The invention is defined by the appended claims with the specific embodiment shown in the attached drawings. For the purpose of summarizing the invention, the invention may be incorporated into a new embedded arrowhead removing tool for pulling a lodged archery arrowhead, of a type having threads for shaft attachment, from an object without damaging the arrowhead. The embedded arrowhead removing tool comprises a rod having first and second ends, the second end having threads of a size cooperable with the threads of an arrowhead. An abutment is stationarily mounted on the first end. A weight is slidably mounted on the rod intermediate the abutment and the second end such that the weight may be forcibly struck against the abutment to apply longitudinal shocking force to the rod for extracting an arrowhead attached to the second end. A ring is stationarily mounted on the rod intermediate the weight and the second end for retaining the weight on the rod.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In as much as the foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present invention. It should be realized by those skilled in the art that such equivalent methods and structures do not depart from the spirit and scope of the invention as set forth in the appended claims.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Therefore, it is an object of the present invention to provide a new embedded arrowhead removing tool for pulling a lodged archery arrowhead, of a type having threads for shaft mounting, from an object without damaging the arrowhead.

It is another object of the present invention to provide a new embedded arrowhead removing tool which may be easily and efficiently manufactured and marketed.

It is a further object of the present invention to provide a new embedded arrowhead removing tool which is of a durable and reliable construction.

An even further object of the present invention is to provide a new embedded arrowhead removing tool which is susceptible of a low cost of manufacture with regard to both materials and labor, and which accordingly is then susceptible of low prices of sale to the consuming public, thereby making such embedded arrowhead removing tools economically available to the buying public.

Still yet another object of the present invention is to provide a new embedded arrowhead removing tool which provides in the apparatuses and methods of the prior art some of the advantages thereof, while simultaneously overcoming some of the disadvantages normally associated therewith.

Still yet another object of the present invention is to provide a new embedded arrowhead removing tool that will dislodge an arrowhead which is fully embedded into an object.

Yet another object of the present invention is to provide a new embedded arrowhead removing tool that is adapted for removing most conventional arrowheads including field points and broadheads.

Even still another object of the present invention is to provide a new embedded arrowhead removing tool that is adapted for removing embedded arrowheads regardless of the strength of the user.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention. The foregoing has outlined some of the more pertinent objects of this invention. These objects should be construed to be merely illustrative of some of the more prominent features and applications of the present invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 4:
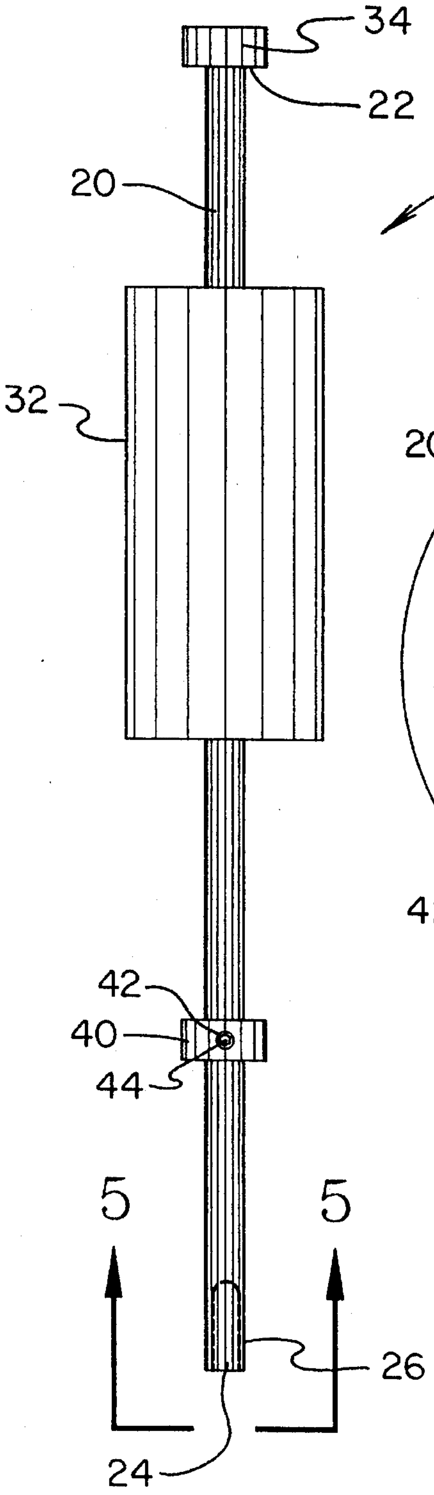
FIG. 4 is a side elevational view of the invention of FIG. 3.
Figure 5:
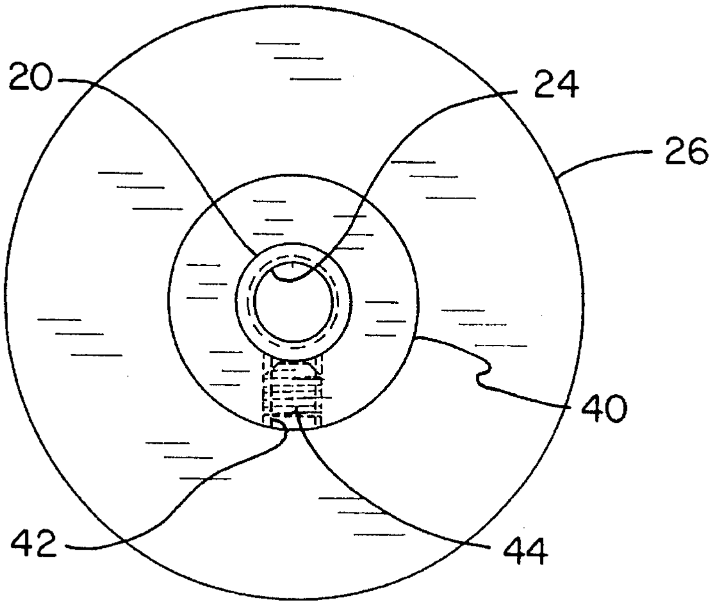
FIG. 5 is a bottom plan view of the preferred embodiment of the present invention.
Figure 6:
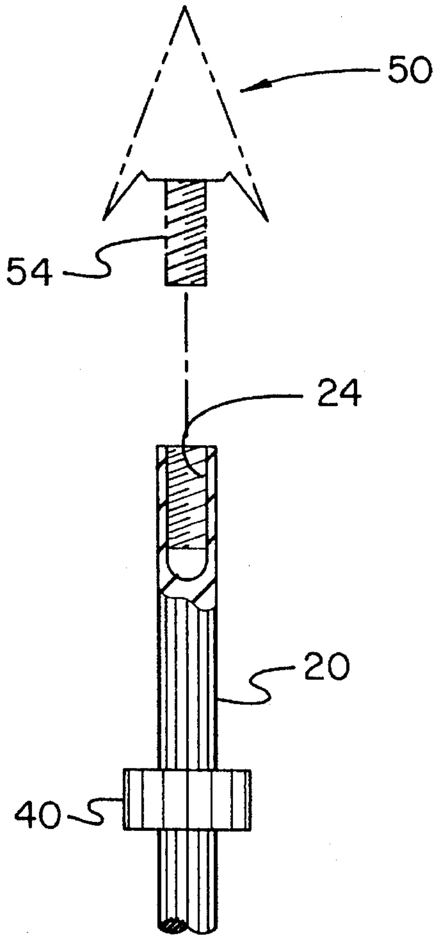
FIG. 6 is a side elevational detail view of the invention of FIG. 4 showing the manner of arrowhead attachment.
Figure 7:
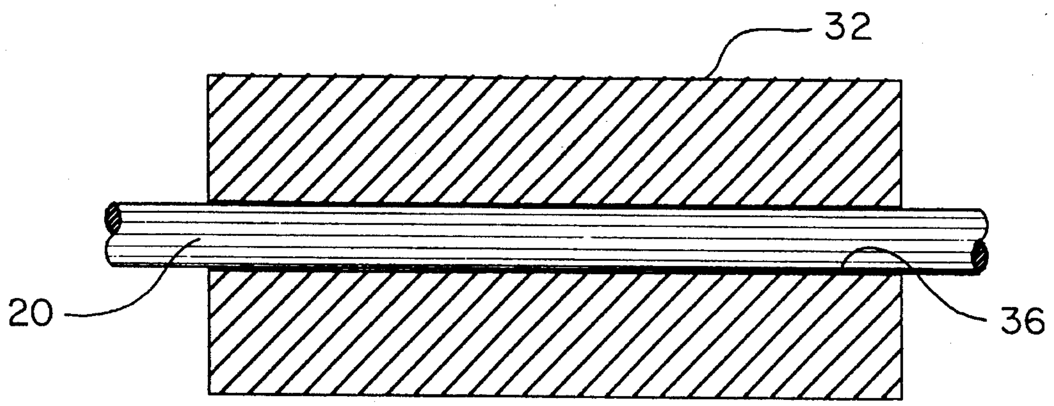
FIG. 7 is a partial side elevational view of the invention of FIG. 4 showing the weight sectioned along it's longitudinal axis mounted on the rod.

With reference now to the drawings, and in particular to FIG. 4 thereof, a new embedded arrowhead removing tool embodying the principles and concepts of the present invention and generally designated by the reference numeral 10 will be described.

Figure 1:
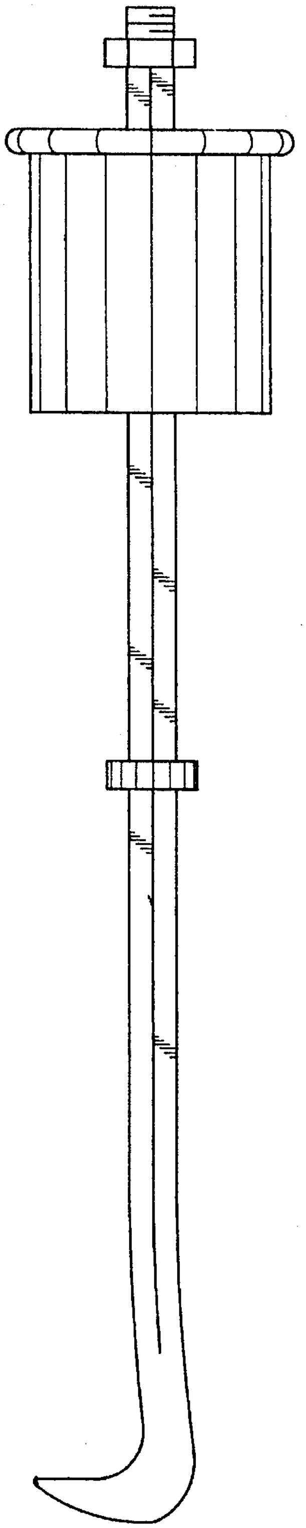
PRIOR ART FIG. 1
FIG. 1 is a side elevational view of a prior art slide hammer nail puller having characteristics similar to the present invention embedded arrowhead removing tool.
Figure 2:
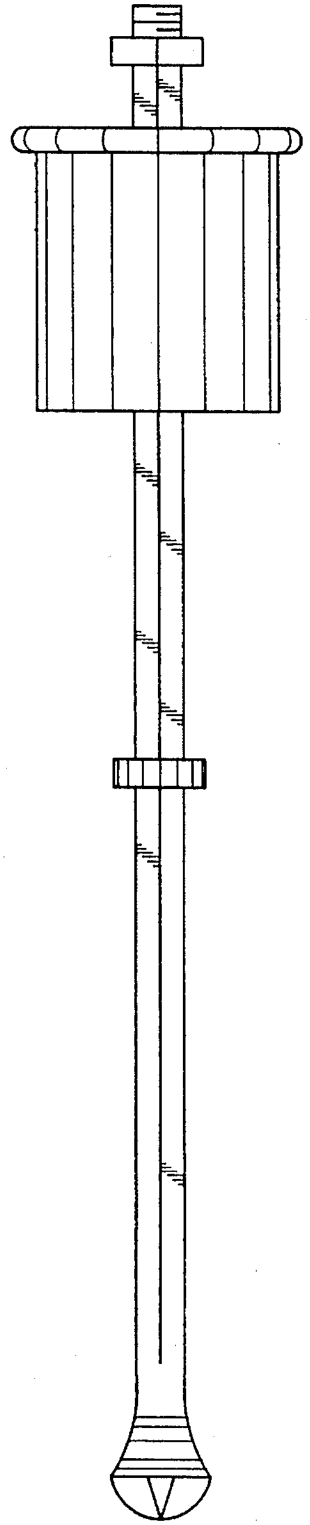
PRIOR ART FIG. 2
FIG. 2 is a front elevational view of the prior art invention of FIG. 1.
Figure 3:
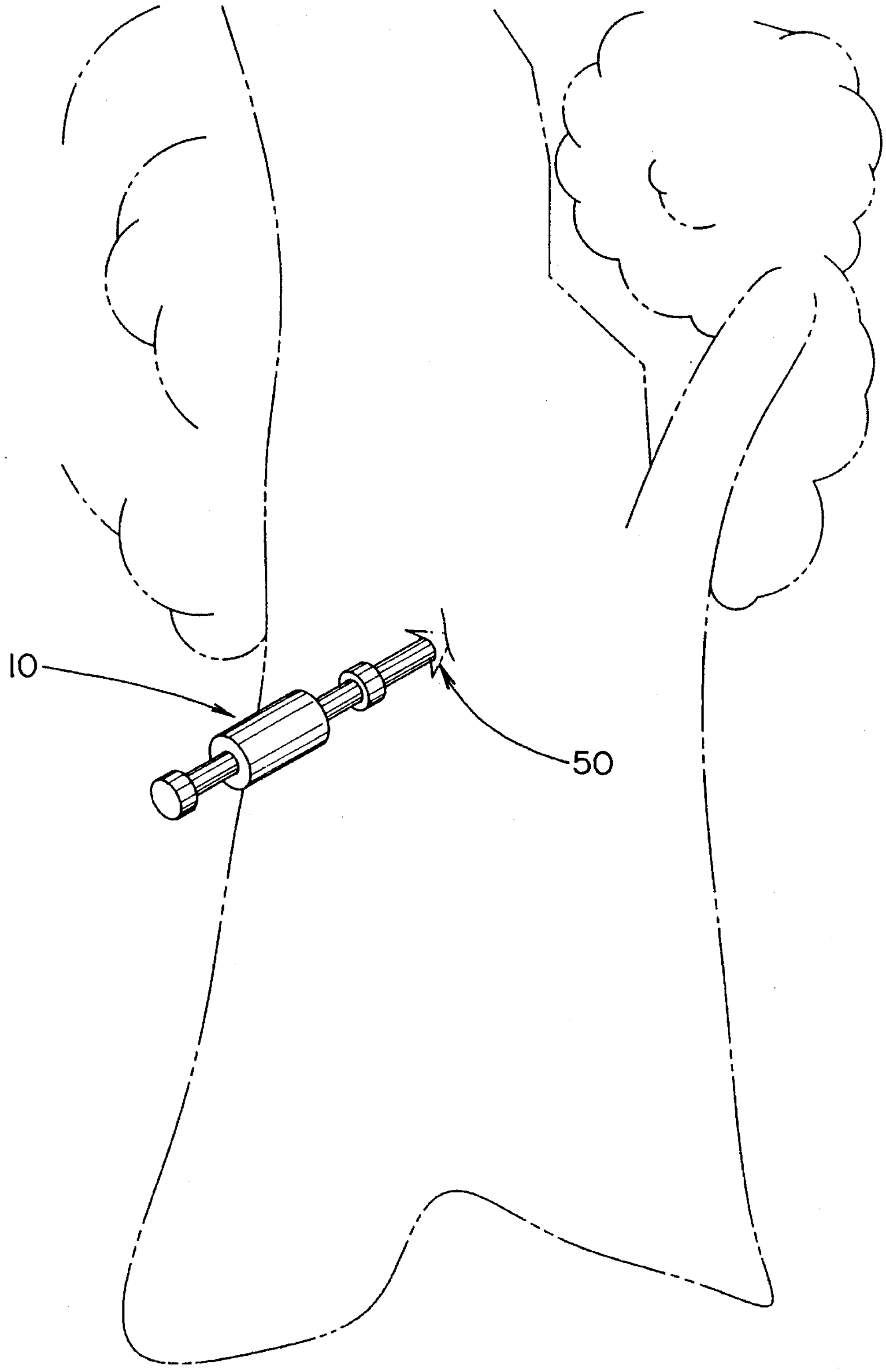
FIG. 3 is a perspective view of the preferred embodiment of the present invention showing its manner of use.

From an overview standpoint, the embedded arrowhead removing tool is adapted for use for pulling a lodged archery arrowhead, of a type having threads for shaft mounting, from an object without damaging the arrowhead. See FIG. 3.

With reference now to FIGS. 3–7 and more specifically, it will be noted that a new embedded arrowhead removing tool 10 is shown. The embedded arrowhead removing tool 10 comprises a 5/16 inch diameter steel rod 20 having first and second ends 22 and 26, the second end 26 having internal threads 24 of a size cooperable with the threaded stud 54 of an arrowhead 50. An abutment 34 is stationarily mounted on the first end 22. The abutment 34 comprises an enlarged round flange having a diameter substantially larger than the diameter of the steel rod 20.

A generally cylindrical steel weight 32 of approximately 16-ounces is slidably mounted on the rod 20 intermediate the abutment 34 and the second end 26 such that the weight 32 may be forcibly struck against the abutment 34 to apply longitudinal shocking force to the rod 20 for extracting an arrowhead 50 attached to the second end 26. The weight 32 has an axial bore 36 extending therethrough wherethrough extends the steel rod 20. The weight 32 is of a shape and size to be comfortably grasped in a hand.

A steel ring 40 is stationarily mounted on the rod 20 intermediate the weight 32 and the second end 26 for retaining the weight 32 on the rod 20. The ring 40 is secured with a set screw 44 disposed within a lateral threaded bore 42 thereof.

In use, the shaft of an embedded arrow is unscrewed from it's head 50, the shaft being carefully set aside to prevent damage thereto. The rod 20 is screwed onto the embedded arrowhead 50 and the weight 32 is slammed against the abutment 34. The resulting impact produces a substantial force that will invariably drive the arrowhead 50 out cleanly, neatly, and unharmed.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. In as much as the present disclosure includes that contained in the appended claims as well as that of the foregoing description. Although this invention has been described in its preferred forms with a certain degree of particularity, it is understood that the present disclosure of the preferred form has been made only by way of example and numerous changes in the details of construction and combination and arrangement of parts may be resorted to without departing from the spirit and scope of the invention.

Now that the invention has been described,

What is claimed is:

1. A new embedded arrowhead removing tool for pulling a lodged archery arrowhead, of a type having threads for shaft attachment, from an object without damaging the arrowhead, the embedded arrowhead removing tool comprising: a rod having a first free end and a second free end, the second end having threads formed therein of a size cooperable with the threads of an arrowhead, the second end having internal threads cooperable with an arrowhead having a threaded stud for shaft attachment, the diameter of the rod being within the range of ¼ inch to 5⁄16 inch; a cylindrical abutment of a first exterior diameter stationarily mounted on the first end; a cylindrical weight of a second exterior diameter greater than the first exterior diameter slidably mounted on the rod intermediate the abutment and the second end such that the weight may be forcibly struck against the abutment to apply longitudinal shocking force to the rod for extracting an arrowhead attached to the second end, the weight being of a shape and size to be comfortably grasped in a hand, the weight being approximately 16 ounces in weight; and a ring stationarily mounted on the rod intermediate the weight and the second end for retaining the weight on the rod, the ring being secured with a set screw disposed within a lateral threaded bore in the ring, the tool being made of steel.

* * * * *